Nov. 16, 1943.    G. SCHIEMAN    2,334,585
LAMINATED RUBBER HYDROHALIDE AND CELLULOSE ACETATE TAPE
Filed April 17, 1942

INVENTOR.
Gustave Schieman,
BY Parkinson & Lane Attys

Witness:
Chas. L. Hursh.

Patented Nov. 16, 1943

2,334,585

UNITED STATES PATENT OFFICE 2,334,585

LAMINATED RUBBER HYDROHALIDE AND CELLULOSE ACETATE TAPE

Gustave Schieman, Toledo, Ohio, assignor to International Plastic Corporation, Morristown, N. J., a corporation of Illinois Application April 17, 1942, Serial No. 439,348

4 Claims. (Cl. 154—43)

The present invention relates to tape and more particularly to a transparent pressure sensitive or pressure sealing tape.

It is an object of my invention to provide a laminated rubber hydrohalide tape, that is, a laminated tape including a layer of rubber hydrohalide such as that sold under the trade name "Pliofilm," for example, a layer of rubber hydrochloride, which tape while maintaining the flexibility of the rubber hydrohalide itself, provides increased tensile strength and prevents the rubber hydrohalide from stretching or warping by the usual conditions imposed upon it during the process of manufacture and during subsequent use.

It is a further object of my invention to provide a laminated Pliofilm and cellulose acetate tape which permits the Pliofilm to be drawn by a re-wind roller through a drier at elevated temperatures without warping, stretching or tearing the Pliofilm.

It is a further object of my invention to provide an improved, pliable, composite and transparent pressure sealing or pressure sensitive tape which is moisture, vapor, gas, alkali, acid and grease proof, and which at the same time has a high dielectric constant and insulating properties and which is tear and puncture resistant and is non-explosive and impervious to normal heat and cold.

It is a further object to provide such tape which while utilizing Pliofilm as part of the structure overcomes the objectionable characteristics of Pliofilm for tape such as warping, stretching under temperature or strains such as encountered when passing the tape through a drying chamber during the process of manufacture.

It is a further object of my invention to provide a pressure sensitive tape having a base of laminated Pliofilm and cellulose acetate.

It is a further object to provide a non-thermoplastic transparent tape which is non-stretchable under ordinary strains imposed upon it in the process of manufacture or in use.

The above and other features of novelty, advantages, and capabilities will readily become apparent from a detailed description of the accompanying drawing in which I have illustrated a tape structure embodying one form of my invention and an apparatus and method of manufacturing the tape. However it is to be understood that the drawing is illustrative only and does not define the limits of my invention except insofar as they are defined by the appended claims.

Referring to the drawing.

"Pliofilm" as used herein refers to material such as described in United States Letters Patent No. 1,989,632, issued January 29, 1935, to Calvert. It is transparent as well as moisture proof and has high insulating properties and dielectric capacity.

It has been attempted heretofore to produce Pliofilm tape but such attempt was very unsatisfactory and inherently embodied various apparent objections.

With my present invention I produce a pressure sensitive or pressure sealing tape having a non-thermoplastic adhesive. After the adhesive has been applied the tape must pass through a long drier to take out the solvents from the adhesive and/or repellent. In doing so the tape is put under a substantial strain, that is, there is a sufficient load imposed on it to cause it to stretch and warp. In fact the Pliofilm as I have found from my experiments would stretch to such an extent as to not only destroy its own effectiveness and lose its shape and original characteristics, but would wreck completely the adhesive. In other words, it would thin the adhesive, by such stretching and warping, to such an extent that it would not function as an adhesive at all. Therefore, after long experimentation, I have solved this problem and produced a commercially highly satisfactory tape utilizing Pliofilm as a base by first laminating to the Pliofilm a thin film of cellulose acetate. This cellulose acetate film is laminated to the Pliofilm as a carrier before the Pliofilm passes through the drier and before the repellent and adhesive surfaces are applied. This thin film of cellulose acetate, as before stated, acts as a carrier and permits the Pliofilm tape to be drawn through the drier in order that the solvents may be taken out of the repellent and adhesive and at the same time prevents the Pliofilm from stretching and warping. This is due to the fact that the cellulose acetate utilized has a greater tensile strength than the Pliofilm. In other words the cellulose acetate is relatively non-elastic as compared with Pliofilm. In fact the cellulose acetate film utilized in my invention might be correctly termed a rigid type of acetate film. In order to remove the solvent it is essential that the composite structure travel over a relatively long course through the drier because of the limits of the temperature which can be imposed and thus requires considerable time to remove the solvents. Even so, in order to keep the length of travel within any reasonable bounds it is necessary to utilize temperatures which in certain instances are above the softening of the Pliofilm.

Figure 1:
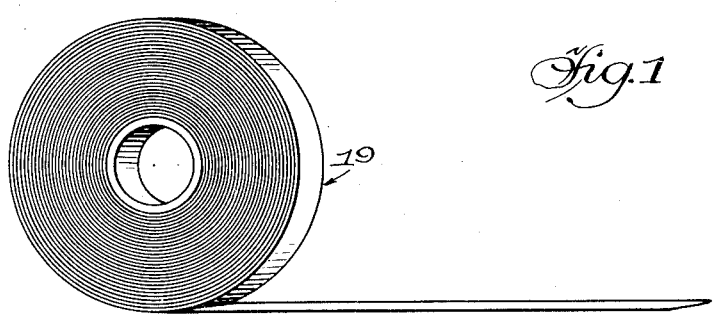
Fig. 1 is a perspective of a roll of tape embodying my invention.
Figure 2:
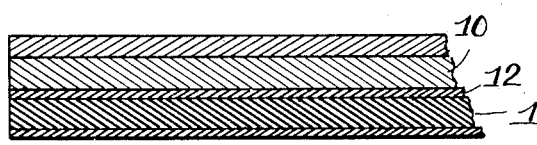
Fig. 2 is a longitudinal sectional view of a laminated Pliofilm and cellulose acetate transparent tape embodying one form of my invention.
Figure 4:
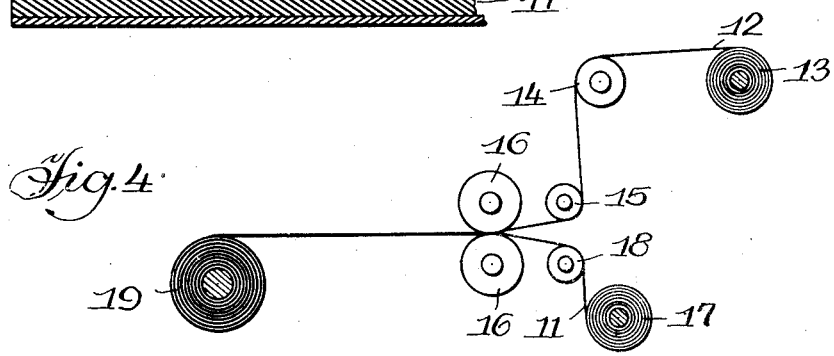
Fig. 4 is a diagrammatic view of an apparatus for carrying out the method of manufacturing the laminated Pliofilm and cellulose acetate.

Referring now to a detailed description of the laminated Pliofilm cellulose acetate tape as shown in Fig. 2, the completed tape or structure consists of a lamination of Pliofilm 10 to which there is laminated a film 11 of cellulose acetate by means of the laminating adhesive 12. This method or operation of laminating the cellulose acetate to the Pliofilm may be carried out by the method or apparatus diagrammatically shown in Fig. 4 or by other suitable method or means. As shown in Fig. 4 the Pliofilm 12 is drawn from a roll 13 over a roller 14 and thence under a roll 15 forwardly between a pair of opposed pressure rolls 16. The cellulose acetate 11 is drawn from a roll 17 over a roller 18 and thence passes forwardly between the pressure roller 16. Between the roller 18 and roll 17 there is applied by any suitable means to the cellulose acetate film, a suitable laminating adhesive so that when the Pliofilm and cellulose acetate pass between the pressure or laminating rollers 16, the two films are laminated and emerge from the pressure rollers as a laminated composite structure which is then wound into a roll 19 of laminated material.

With reference to the laminated adhesive for laminating the cellulose acetate to the Pliofilm I have obtained highly satisfactory results by coating the cellulose acetate film at the point heretofore indicated with a laminating adhesive having for example the following composition:

| | Per cent |
|---|---|
| Vistanex polybutene | 50 |
| Hydrogenated terpene resin, M. P. 50° C. | 50 |

This laminating adhesive is coated on the cellulose acetate in such a manner as to leave a coating of a thickness on the order of .0002" after evaporation of the solvents. As is obvious and as indicated by the above description, the laminating adhesive surface of the cellulose acetate film passes through the pressure or laminating roller 16 in direct contact with the Pliofilm.

In providing my improved tape I utilize a thin transparent film of Pliofilm preferably such as described in the Calvert Patent No. 1,989,632, issued January 29, 1935. I also use a thin transparent film of cellulose acetate now commercially sold on the open market preferably having a thickness on the order of .0012".

The cellulose acetate film which I preferably utilize in my invention is relatively non-elastic and when compared with the Pliofilm might well be termed a rigid type of acetate film. It acts as a carrier for the Pliofilm and prevents the Pliofilm from stretching or warping due to the usual strains or conditions ordinarily imposed upon the Pliofilm not only during the drying operation but also during its subsequent use in the field and thus preserves and keeps whole the original intended characteristics of the Pliofilm.

Figure 5:
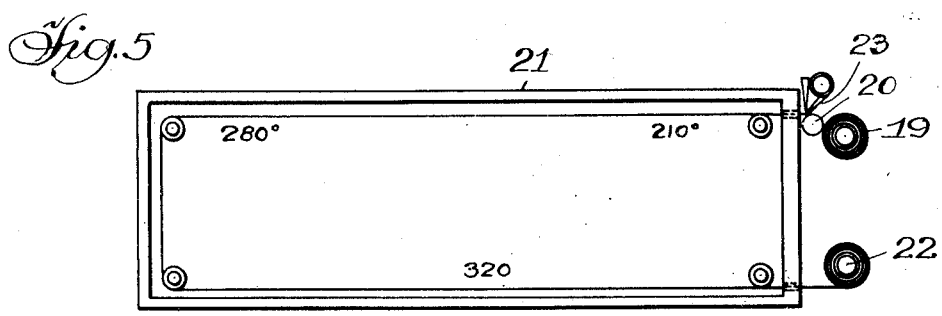
Fig. 5 is a diagrammatic view of the drier illustrating the method employed for applying the adhesive and/or repellent to the laminated structure.

This laminated material is subsequently treated, either as a continuous or separate operation, with a pressure sensitive or pressure sealing adhesive on one side and a suitable repellent on the opposite side. I obtain highly satisfactory results in applying the adhesive and the repellent to the laminated structure by utilizing a drier and/or method such as diagrammatically illustrated in Fig. 5 of the drawing. The free end of the laminated roll 19 is passed over a suitable roller 20, thence through a narrow slotted opening into an elongated drier 21, thence forwardly through the length of the drier over rollers as shown, thence rearwardly through the length of the drier and out through a discharge slot onto a rewind roller 22. This rewind roller 22 is driven by any suitable means not shown. By operating the roller 22 the laminated Pliofilm and cellulose acetate is drawn from the roll 19 and pulled across the long drier, thence downwardly, thence rearwardly throughout the length of the drier.

Just before the laminated material enters the drier it passes under a suitable apparatus or doctor knife 23 where it is supplied or coated with a suitable non-thermoplastic pressure sealing adhesive. I find from my experiments that I obtain highly satisfactory results by using a non-thermoplastic adhesive having for example the following composition:

| | Per cent |
|---|---|
| 1. Vistanex polybutene | 50 |
| Hydrogenated coumarone indene resin, M. P. 20° C | 50 |
| 2. Vistanex | 25 |
| Milled crepe | 25 |
| Hydrogenated coumarone indene | 50 |
| Antioxidant 2% on solids. | |
| 3. Milled crepe | 60 |
| Ester gum | 20 |
| Coumarone indene resin | 20 |
| Antioxidant 2% on solids. | |

Figure 3:
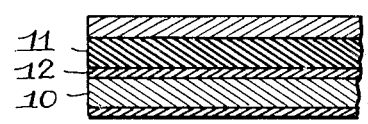
Fig. 3 is a similar view showing a slight modification.

The adhesive is dissolved in a petroleum solvent preferably of low boiling point such as hexane, and then coated onto the laminated structure. Preferably I apply it to the Pliofilm side of the laminated structure. The solvent is evaporated in the drier leaving behind the adhesive film. As the laminated structure with the adhesive applied enters the drier, it is subjected at the forward end of the drier to a temperature on the order of 210° F. As the tape passes through the drier it is progressively and gradually subjected to increasing temperatures until it reaches on the order of 280° F. at a point about one-half way on its course through the drier and thence gradually increased to a temperature on the order of 320° F. at a point in its course of travel near its discharge from the drier. However, instead of applying the pressure sealing adhesive to the Pliofilm side of the laminated structure, it can, as shown in Fig. 3, be applied to the opposite side of the structure, namely, the cellulose acetate side.

After the pressure sealing adhesive is applied, the laminated structure with its adhesive on one side thereof is again passed through the same operation for applying a suitable repellent to the opposite side of the laminated structure and heat treating the same for removing the solvent from the repellent. This material of course must be repellent to the particular adhesive used on the opposite side of the laminated structure so that the convolutions will not adhere together when the finished tape is wound into a finished roll for the market. When utilizing the adhesive, heretofore described, on one side of the laminated structure, I find from experiments that I obtain highly satisfactory results by utilizing a repellent having for example the following composition:

|  | Per cent |
|---|---|
| Hydrolyzed polyvinyl acetate | 50 |
| Igepon (salts of the alkyl sulfanamides of fatty acids) | 50 |

This repellent is dissolved in water to which about 10% alcohol has been added. A solution containing 5% of this repellent may be used for coating.

As mentioned before, the adhesive may be coated on either the cellulose acetate or on the Pliofilm side of the laminated structure. In some instances it is preferable to coat the adhesive on the acetate side so that after applying to an object the Pliofilm surface will be on the outside thus affording maximum protection against moisture, gases and chemicals, etc.

While I have described herein certain preferred forms of adhesive and repellent which have afforded excellent results, other satisfactory repellents and/or adhesives may be used such for example as described in my copending application Serial No. 421,927, filed December 6, 1941. Therefore I do not wish to be limited to the particular adhesives or repellents mentioned.

Having thus described my invention, I claim:

1. As an article of manufacture, a thin film of rubber hydrohalide, a thin film of cellulose acetate laminated thereto, a pressure sensitive adhesive coating on one side of said laminated structure and a repellent film on the opposite side of said structure substantially as and for the purpose set forth.

2. In a tape of the class described comprising a layer of transparent rubber hydrohalide, means laminated to said rubber hydrohalide, which means is relatively non-stretchable under temperature and strain conditions encountered during drying pressure sensitive adhesive coatings, a pressure sensitive adhesive on one side of said structure and a coating on the opposite side of said structure repellent to said adhesive.

3. As an article of manufacture, a thin film of rubber hydrochloride, a thin film of cellulose acetate laminated thereto, a pressure sensitive adhesive coating on one side of said laminated structure and a repellent film on the opposite side of said structure substantially as and for the purpose set forth.

4. In a tape of the class described comprising a layer of transparent rubber hydrochloride, means laminated to said rubber hydrochloride, which means is relatively non-stretchable under temperature and strain conditions encountered during drying pressure sensitive adhesive coatings, a pressure sensitive adhesive on one side of said structure and a coating on the opposite side of said structure repellent to said adhesive.

GUSTAVE SCHIEMAN.

CERTIFICATE OF CORRECTION.

Patent No. 2,334,585.  November 16, 1943.

GUSTAVE SCHIEMAN.

It is hereby certified that error appears in the above numbered patent requiring correction as follows: In the grant, line 1, and in the heading to the printed specification, line 4, residence of inventor, for "Toledo, Ohio" read --Bronx, New York, and that the said Letters Patent should be read with this correction therein that the same may conform to the record of the case in the Patent Office.

Signed and sealed this 18th day of January, A. D. 1944.

(Seal)

Henry Van Arsdale,
Acting Commissioner of Patents.